United States Patent
Deutsch et al.

(10) Patent No.: US 6,263,650 B1
(45) Date of Patent: Jul. 24, 2001

(54) COTTON HARVESTER WITH ACCUMULATOR

(75) Inventors: Timothy Arthur Deutsch, Newton; Virgil Dean Haverdink; Michael Lee Pearson, both of Ankeny, all of IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/401,253

(22) Filed: Sep. 23, 1999

(51) Int. Cl.$^7$ .................................................. A01D 61/00
(52) U.S. Cl. ............................................ 56/16.4 B; 56/432
(58) Field of Search .............................. 56/16.4 B, 341, 56/432, 16.4 R, 16.4 A; 100/88, 151, 82, 7, 138, 40, 152; 460/115, 119

(56) References Cited

U.S. PATENT DOCUMENTS

| | | |
|---|---|---|
| 3,531,004 | 9/1970 | Gaul et al. .......................... 214/147 |
| 4,534,285 | 8/1985 | Underhill ............................. 100/88 |
| 4,548,131 * | 10/1985 | Williams .............................. 100/1 |
| 4,553,378 | 11/1985 | Fachini et al. ....................... 56/16.6 |
| 4,625,502 | 12/1986 | Gerhardt et al. ..................... 56/341 |
| 4,914,900 | 4/1990 | Viaud .................................. 56/341 |
| 4,926,749 | 5/1990 | Neale et al. ......................... 100/177 |
| 4,930,297 | 6/1990 | Schlueter et al. .................... 56/16.6 |
| 4,996,831 | 3/1991 | Pearson et al. ...................... 56/16.6 |
| 5,255,501 | 10/1993 | McWilliams ......................... 56/341 |
| 5,584,762 * | 12/1996 | Buhler et al. ........................ 460/119 |
| 5,609,523 | 3/1997 | Ringwald et al. .................... 460/119 |
| 5,616,077 * | 4/1997 | Covington et al. ................... 460/119 |
| 5,630,313 | 5/1997 | Von Allworden et al. ......... 56/16.4 B |
| 5,857,908 * | 1/1999 | Synder et al. ........................ 460/115 |
| 6,032,446 * | 3/2000 | Gola et al. ............................ 56/341 |

FOREIGN PATENT DOCUMENTS 0 350 514    1/1990    (EP) .

* cited by examiner

Primary Examiner—Robert E. Pezzuto
Assistant Examiner—Árpád Fábián Kovács

(57) ABSTRACT

Cotton accumulator structure includes an upright storage area supported behind the cab of a cotton harvester. A screened upper cover area is supported above the storage area by hydraulic cylinders which move the cover between a raised harvest position and a lowered storage position for reduced transport height. As harvested material is directed through ducts towards the storage area, debris can exit through the screened cover. The lower end of the storage area includes an opening for egress of the cotton. Several shafts having timed projections are journalled for rotation adjacent the opening about parallel axes. The shafts, when not rotating, generally close the lower end and prevent cotton from falling through the opening. To meter the cotton from the storage area to an operating on-board processor, a drive is activated to rotate the shafts. Preferably, the shafts are driven in counter-rotating fashion so that a given shaft rotates in the opposite direction from the next adjacent shaft, and projections on the shaft pull cotton from the storage area. Cotton is uniformly distributed from the storage area onto a belt extending from the processor which preferably is part of a compacting system on a baler or module builder located downstream of the storage area opening. The storage area facilitates continued harvesting during processor unloading and allows the processor to run only as needed to periodically unload the storage area.

23 Claims, 4 Drawing Sheets

COTTON HARVESTER WITH ACCUMULATOR

BACKGROUND OF THE INVENTION

1) Field of the Invention

The present invention relates generally to cotton harvesting implements and, more specifically, to an accumulator arrangement for a cotton harvester having on-board cotton processing such as compacting.

2) Related Art

Cotton harvesters having on-board module forming structure, such as described in co-pending application Ser. No. 09/056,259 filed Apr. 6, 1998 and entitled DENSIFICATION METHOD AND APPARATUS FOR HARVESTED COTTON OR OTHER SIMILAR FIBROUS MATERIAL now U.S. Pat. No. 6,032,446, provide a compact bale or module directly on the harvester to reduce the amount of support equipment needed in the field and minimize harvester idle time during offloading. The on-board processing structure includes a bale handling system for moving a formed bale rearwardly to prepare the bale chamber for a second bale with little or no harvester down time.

An accumulation area or similar structure for harvested crop is also desirable to allow harvesting to continue during brief interruptions in the operation of the module forming structure or other crop processor. Problems with such an accumulation area include regulating the cotton metered from the area to avoid excessive cotton flow that would clog the input to the processor, while assuring a generally continuous flow for uniform processing. If cotton flow varies too much, the integrity of the formed bale in the module builder can be jeopardized. To provide a good mat of material to a bale chamber of a module builder, the flow should be uniform and the cotton should also be uniformly distributed across the width of the in-feed area to the chamber. Metering cotton from an area with uniformity and without clumping has proved to be troublesome. Running the processor continuously, particularly in low yield conditions, results in unnecessary wear and power consumption. There are times the flow from the accumulator must be completely stopped, for example, when the processor is unloading. An accumulator system that can simply and reliably provide adequate storage with uniform feeding and distribution across the width of the in-feed area with a flow cut-off feature is required. Also, an accumulator system can add height to the area of the harvester behind the cab and result in problems with transport clearance.

BRIEF SUMMARY OF THE INVENTION

It is therefore an object of the present invention to provide an improved on-board cotton handling system that overcomes most or all of the aforementioned problems. It is a further object to provide such a system which reduces or eliminates harvester down time during unloading of the crop from the harvester. It is another object to provide such a system which provides uniform, regulated flow from an accumulation area. It is still another object to provide such a system which reduces or eliminates clumping of cotton in the exit area of the accumulator.

It is a further object of the present invention to provide an improved cotton handling system for a cotton harvester which facilitates on-board processing of the cotton. It is another object of the present invention to provide such a system having accumulator structure providing uniform distribution of cotton to the on-board processor. It is still another object to provide such a system which is relatively simple yet reliable in construction and which can meter and uniformly distribute cotton. The system also permits continued crop harvesting for brief periods when the processor is stopped, for example, when the processor is a baler or module builder and a bale or module is being removed from the forming chamber. The system further reduces variations in feeding rate when the on-board processor is operating.

It is yet another object of the invention to provide an improved cotton handling system which facilitates on-board processor unloading while harvesting continues. It is a further object to provide such a system wherein the wear and power consumption of the processor is minimized. It is another object to provide such a system wherein the processor is powered only as needed to unload the accumulator.

It is still a further object to provide an improved cotton accumulator and distributor structure for a cotton harvester. It is another object to provide such a structure which reliably gates and meters cotton to the input of an on-board processor such as a bale or module builder with minimum clumping and reduced torque peaks. It is still another object to provide such a structure which facilitates formation of a continuous, uniform mat of cotton.

It is yet another object to provide an accumulator system for a cotton harvester which achieves good capacity and a reduced transport height.

In an embodiment of the invention, the cotton accumulator structure includes an upright storage area supported on a cotton harvester frame behind the cab. A screened upper cover is adjustably supported above the storage area by hydraulic cylinders which move the cover between a raised harvest position and a lowered storage position for reduced transport height. Cotton conveying ducts extending upwardly and rearwardly from harvesting structure at the forward end of the frame open into the upper cover and telescope as the cover is moved between positions. As harvested material is directed towards the storage area, debris can exit through the screened cover.

The lower end of the storage area is tapered and includes an opening for egress of the cotton. Several shafts or metering rolls having projections are journalled for rotation adjacent the opening about parallel axes and define a storage area metering floor. The metering rolls, when not rotating, generally close the lower end and prevent cotton from falling through the opening. To meter the cotton from the storage area, a drive is activated to rotate the rolls. Preferably, the shafts are driven in counter-rotating fashion so that a given shaft rotates in the opposite direction from the next adjacent shaft. The rolls meter the cotton across the opening for improved operation of processing structure located downstream of the storage area opening.

The storage area provides a continuous supply of cotton material to the processor on the harvester when the processor is running. The accumulator structure allows harvesting to continue as the processor unloads. To reduce wear and power consumption, the processor runs only as needed to periodically unload the accumulator. Such a system also allows uniform feed rate to the processor during processor operation despite variations in harvested crop yield. In the embodiment shown, the processor is a module builder, and a continuous mat of compressed material with locked fibers is formed into a uniform, high density bale or module on the harvester. Variations in density are reduced and the integrity of the compacted mass are improved substantially over those associated with previously available bulk handling compacting methods and apparatus.

DETAILED DESCRIPTION OF THE DRAWINGS

Figure 1:
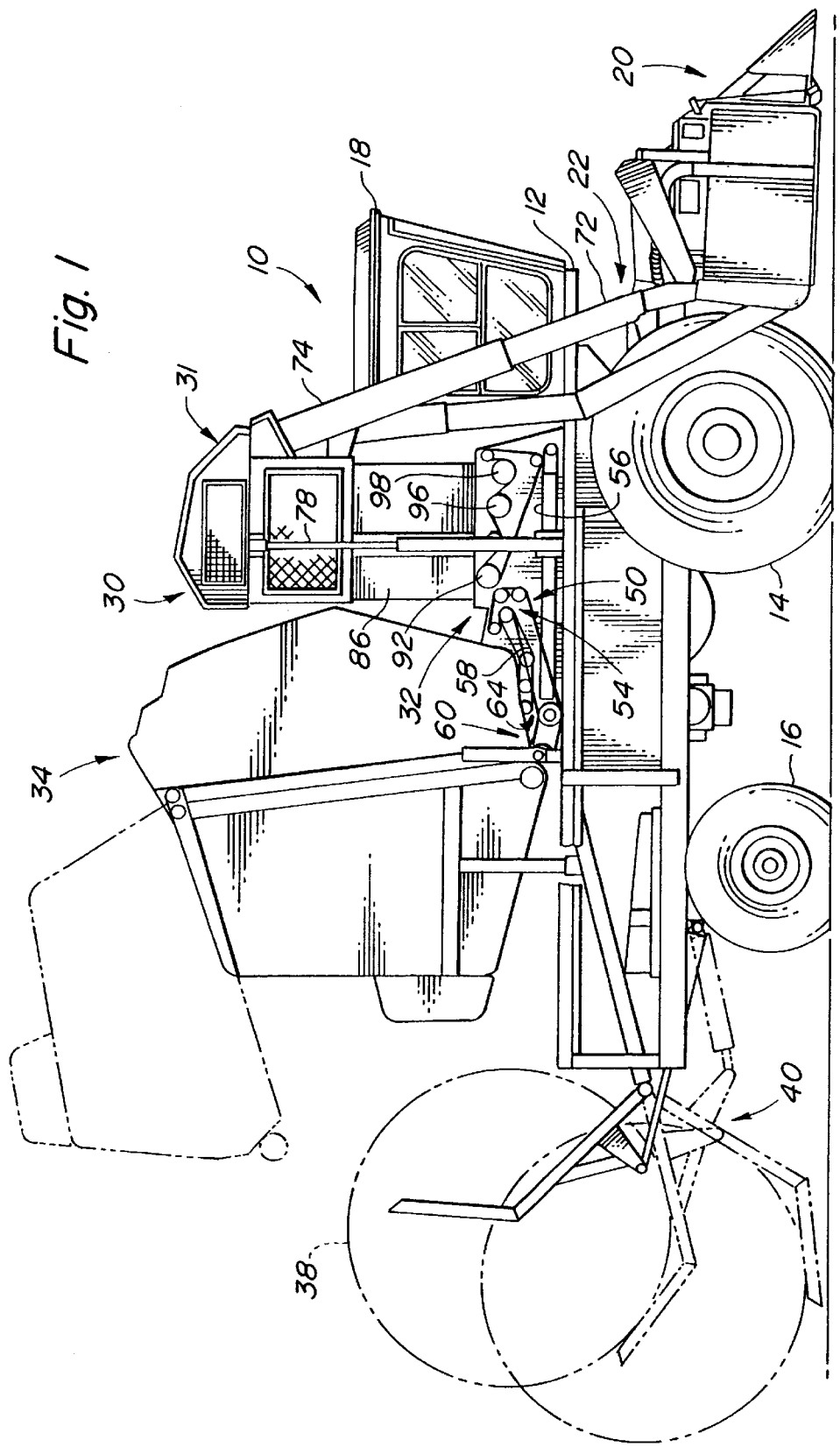
FIG. 1 is a side view of a cotton harvester having an accumulator system mounted on the harvester frame forwardly of an on-board processor which is shown as a baler.

Referring now to FIG. 1 therein is shown a cotton harvester 10 having a main frame 12 supported for movement by forward drive wheels 14 and rear steerable wheels 16. An operator station or cab 18 is supported at the front end of the main frame 12 above forwardly mounted harvesting structure indicated generally at 20 which removes cotton from plants and directs the removed cotton into an air duct system 22.

An upright accumulator system 30 with an upper inlet structure 31 and a metering floor 32 is supported on the frame 12 behind the cab 18 for receiving the cotton from the air duct system 22. A selectively operable processor 34 which, as shown, is a bale or module builder supported rearwardly of the accumulator system 30. The accumulator system 30 stores cotton as necessary, and the metering floor 32 uniformly distributes the cotton to the module builder 34 which first forms a compressed mat of material and then rolls the mat into a compact bale or module 38. A module handling system 40 is located rearwardly of the processor 34 for receiving a bale or module from the processor. The system 40 temporarily supports the module and then discharges it from the harvester.

The processor 34 as shown is generally a continuous motion type having an in-feed area indicated generally at 50 for receiving the fibrous material in an uncompressed state metered from the floor 32 of the accumulator system 30. A vertical compaction zone 54 including a lower belt or conveyor 56 and an upper belt 58 angled toward the lower belt 56 in the rearward direction compresses the material from its free state to a compressed mass in a generally continuous motion process. The accumulator 30 allows harvesting to continue if for any reason the processor 34 is stopped momentarily, for example, during movement or unloading of a bale or module 38 from the forming chamber of the processor 34 on the harvester. While the processor 34 unloads, cotton is allowed to build up in the accumulator system 30. In low yield cotton conditions, the processor 34 can be cycled on and off as necessary to periodically unload or empty the accumulator system 30 thereby reducing processor wear and power consumption compared to a system which has to run continuously.

In a material such as seed cotton, a sphere of spring-like fibers radiate out from the seed, and the material does not take a permanent set when simply compressed. To lock the fibers of the compressed cotton and prevent the material from simply springing back, the compressed material is processed in a shear or differential translation zone 64 which follows the compaction zone 54. As the portions are moved differentially, the spring-like fibers of the seed cotton are pulled across each other and interlock to prevent the compressed mass from expanding back towards its original low density state. The compressed mass is then fed into a baling chamber or module builder 34 to form a compact bale in a manner similar to formation of a large bale of hay or straw by a conventional round baler or module builder.

Figure 2:
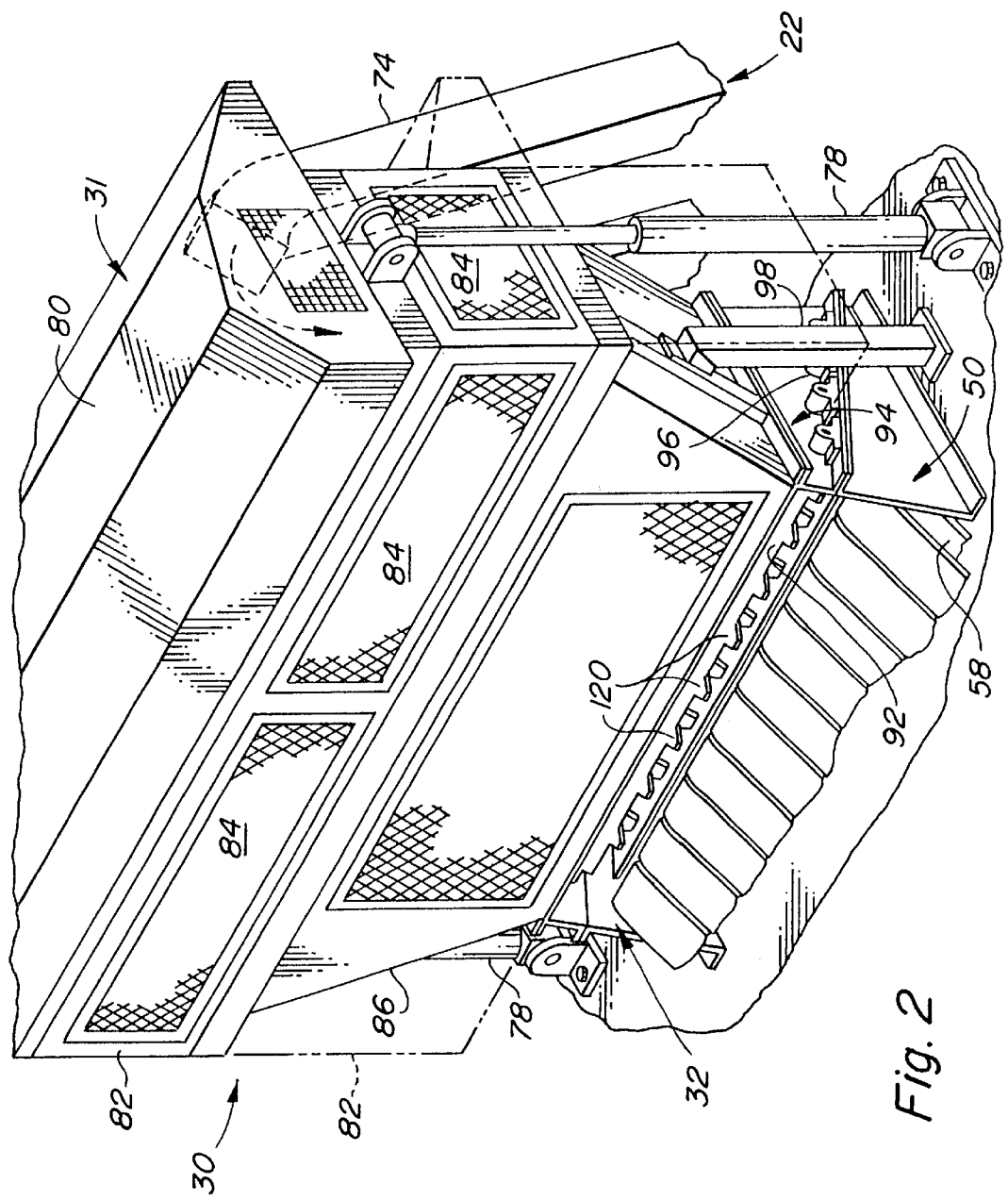
FIG. 2 is a perspective view showing the accumulator system with upper inlet structure in the field working position (solid lines) and in the retracted position (broken lines) for transport.

The air duct system 22 includes lower duct sections 72 connected to the harvesting structure 20 and telescoped within upper duct sections 74. The sections 74 are connected to and open into the inlet structure 31. The inlet structure 31 includes an upper paneled section or lid portion 80 fixed to and opening downwardly into rectangular section 82 with screens 84 which allow some debris to separate from the cotton and exit the accumulation area. The section 82 is telescopingly received over a lower storage area 86 which tapers inwardly in the downward direction to a connection with the metering floor 32 which closes the bottom of the area 86. The cylinders 78 when extended as shown in FIGS. 1 and 2 raise the inlet structure 31 to the field operating position and telescope the ducts sections 72 and 74 to working positions. To reduce the height of the accumulator system, the cylinders 78 are retracted to telescope the section 82 over the storage area 86 (see broken lines of FIG. 2). As the inlet structure 31 is lowered, the upper duct sections 74 move downwardly with the structure 31 and the lower duct sections 72 telescope within the duct sections 74.

Figure 3:
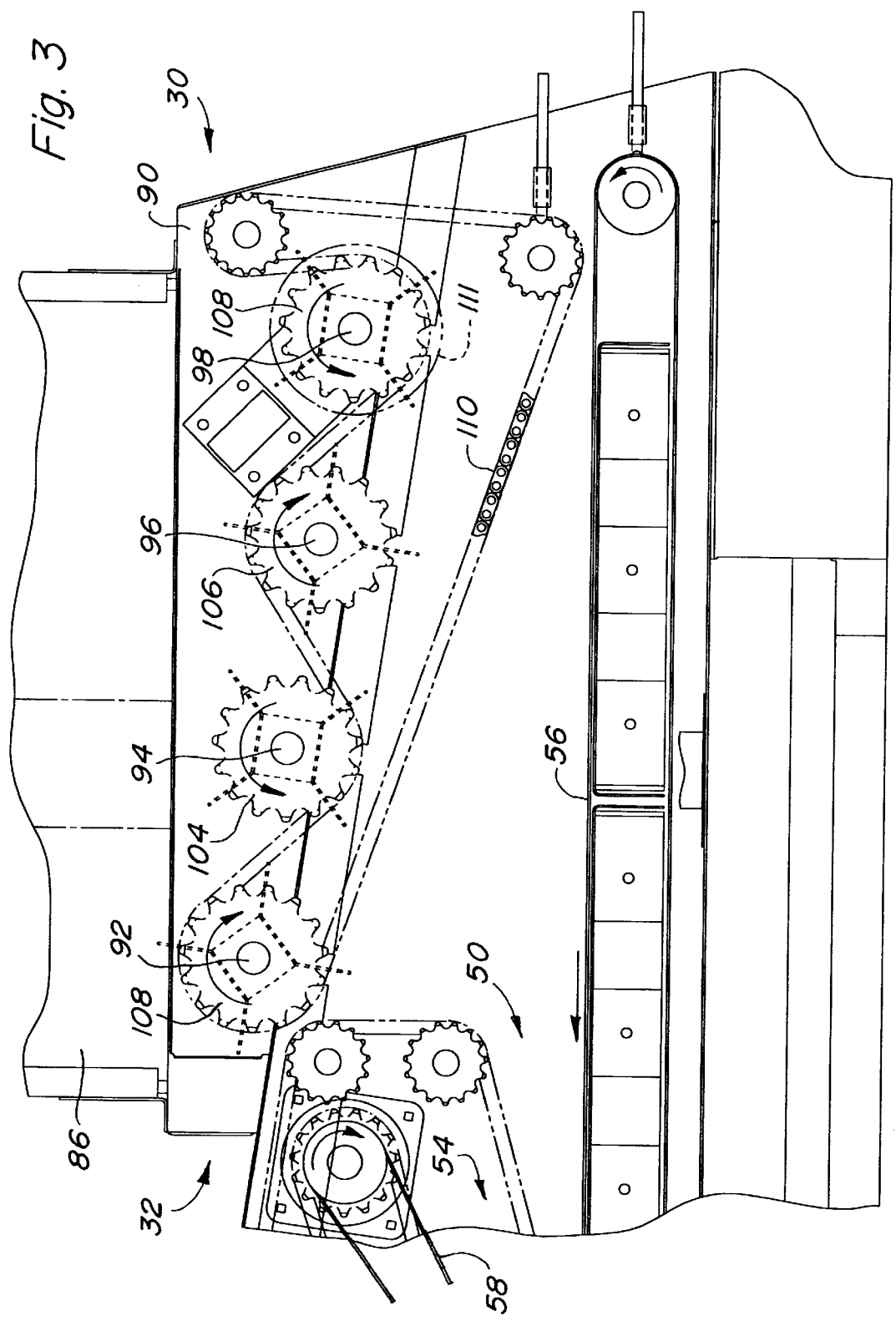
FIG. 3 is an enlarged side view of the lower portion of the accumulator system showing the drive for the accumulator metering floor rolls.
Figure 4:
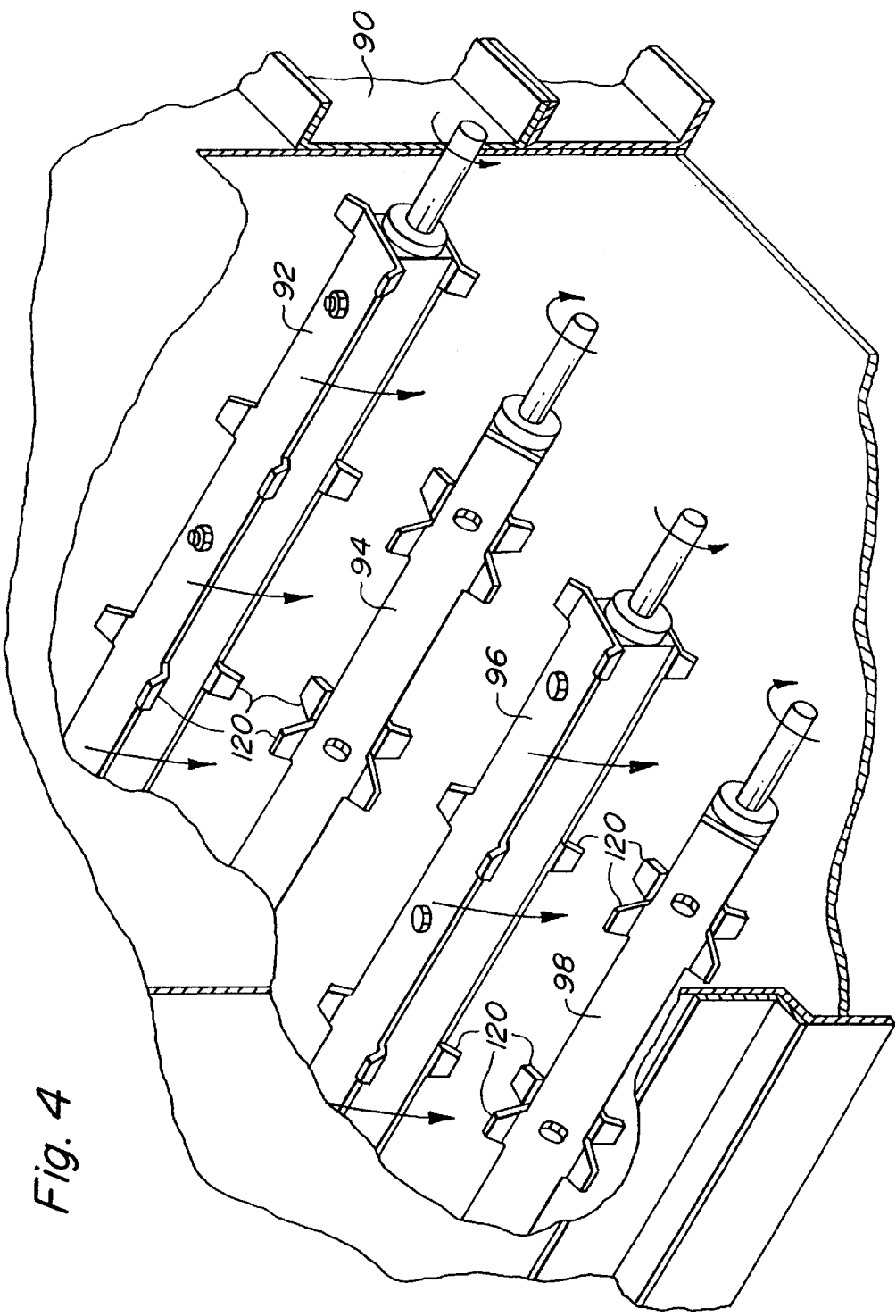
FIG. 4 is a perspective view of a portion of the rolls of FIG. 3 illustrating roll counter-rotation.

The metering floor 32 includes a support frame 90 connected to the lower end of the storage area 86 and rotatably mounting metering rolls 92, 94, 96 and 98 generally in a plane which, as best seen in FIG. 2, angles upwardly with respect to the conveyor 56 in a downstream direction, that is, towards the processing structure 34. As shown in FIGS. 1 and 3, the conveyor 56 extends generally horizontally under the metering floor 32 behind the harvester cab 18. The rear rolls 92 and 94 are offset above the conveyor 56 a sufficient distance to provide clearance for metering cotton onto the cotton already deposited on the conveyor 56 from the front rolls 96 and 98.

Drive sprockets 102, 104, 106 and 108 are fixed to an end of each roll and are driven by a chain 110 (FIG. 3) to provide counter-rotation of the rolls. The chain 110 is trained over alternating sprockets 92 and 96 and under sprockets 94 and 98 so that pairs of adjacent rolls (92,94; 96,98) rotate in opposite directions to draw cotton downwardly between the rolls 92 and 94 and between the rolls 96 and 98. A conventional drive, such as a hydraulic motor 111, selectively provides power to the sprockets through the chain 110. The processor 34 is also driven in a similar manner, and preferably the drives to the processor and rolls are operated generally in unison so that cotton is metered from the floor 32 onto the conveyor 56 only when the processor is operating.

Short projections 120 spaced laterally on each of the rolls 92–98 help to pull cotton downwardly between each roll pair 92,94 and 96,98 when driven by the chain 110. As shown, the projections on one roll are timed so that they are 90 degrees out of phase with the projections on the adjacent roll to help reduce clumping and reduce torque peaks. When the rolls 92–98 remain undriven, they act as a floor to generally prevent egress of the cotton from the storage area 86 onto the conveyor 56. For example, when the processor 34 is stopped to unload a bale or module, the harvesting operation can continue as the drive to the rolls 92–98 is interrupted, and cotton is stored in the area 86 until the processor 34 is again ready to receive cotton, that is, when the processor is operational. The system prevents short-term variations in the amount of cotton harvested, such as the variations caused by spotty field conditions and skips or ends in the row, from adversely affecting the supply of material to the processor 34 when the processor is operating.

Having described the preferred embodiment, it will become apparent that various modifications can be made without departing from the scope of the invention as defined in the accompanying claims.

We claim:

1. In a cotton harvester for removing cotton from plants including duct structure conveying removed cotton, and selectively operable processing structure connected to the harvester for processing of the removed cotton, the processing structure including a cotton inlet, accumulator structure comprising:

an upright storage area located downstream of the duct structure and receiving the cotton removed from the plants, the storage area including a lower, downwardly opening discharge area offset above the cotton inlet;

rotatable structure located adjacent the lower discharge area and generally closing the lower discharge area when not rotated to prevent cotton from exiting the storage area into the inlet; and a drive connected to the rotatable structure to move the received cotton from the lower discharge area of the storage area towards the cotton inlet, wherein the storage area and rotatable structure when not rotated define a generally closed container to facilitate cotton storage for continuous harvester operation during interruption of operation of the processor structure and a generally uniform supply of cotton to the processing structure when the processing structure is operating and the rotatable structure is rotating.

2. The accumulator structure set forth in claim 1 wherein the rotatable structure includes at least two rotatable adjacent shafts having projections, the shafts defining a lowermost boundary of the storage area and preventing flow of cotton from the storage area to the cotton inlet when the rotatable structure is not driven.

3. The accumulator structure set forth in claim 2 wherein projections on one of the shafts are offset from the projections on the adjacent shaft, the projections facilitating stoppage of cotton flow from the storage area when the rotatable structure is not driven.

4. The accumulator structure set forth in claim 1 wherein the rotatable structure comprises a pair of adjacent shafts, and the drive counter-rotates adjacent shafts to pull the cotton between the adjacent shafts.

5. The accumulator structure set forth in claim 4 wherein the adjacent shafts include projections spaced along the shafts.

6. The accumulator structure set forth in claim 1 further comprising an upper area on the storage area opening into the duct structure, the upper area movable vertically between a raised operating position and a lowered transport position.

7. The accumulator structure set forth in claim 1 wherein the processing structure includes an on-board module builder, the cotton input having a preselected width for receiving cotton from the storage area, the rotatable structure including means for distributing the cotton uniformly across the width of the cotton input when the processor is operating.

8. The accumulator structure set forth in claim 7 wherein the on-board module builder includes a compressor having a conveyor and the rotatable structure is located above the conveyor.

9. The accumulator structure as set forth in claim 8 wherein the rotatable structure when driven deposits cotton from the storage area onto the conveyor and when undriven generally closes the storage area to egress of cotton.

10. The accumulator structure as set forth in claim 8 wherein the rotatable structure defines a metering floor at the lower end of the upright storage area located generally in a plane, the plane angled upwardly with respect to the conveyor in a downstream direction towards the processing structure.

11. In a cotton harvester including harvesting structure for removing cotton from plants, duct structure conveying removed cotton downstream from harvesting structure, and module building structure connected to the harvester for processing of the removed cotton, the module building structure including an inlet, accumulator structure comprising:

an upright storage area supported by the harvester at a location downstream of the duct structure and receiving the cotton removed from the plants, the upright storage area including an upper input end for receiving the removed cotton and a lower discharge end opening toward the inlet;

a metering floor located adjacent the discharge end above the inlet, the metering floor including spaced metering rolls defining a lowermost extremity of the storage area; and a selectively operable drive driving the metering rolls to move the received cotton from the discharge end towards the inlet of the processing structure, the storage area and metering floor facilitating a continuous and uniform supply of cotton to the processing structure when the drive is operating and preventing egress of cotton to the inlet when the drive is not operating.

12. The accumulator structure set forth in claim 11 wherein the metering rolls are rotatable about generally parallel axes lying in a plane having horizontal and vertical components, the horizontal component of the plane being substantially greater than the vertical component, wherein the shafts close the lower discharge end and prevent cotton from moving from the discharge end when the drive is not operated.

13. The accumulator structure set forth in claim 11 wherein the upper input end includes a lid portion movable between a raised harvesting position and a lowered transport position.

14. The accumulator structure set forth in claim 11 wherein the metering rolls include pairs of adjacent rolls rotating in opposite directions when the drive is operated to pull cotton between the rolls, wherein the rolls include axes lying generally in a plane having a substantial horizontal component.

15. The accumulator structure set forth in claim 11 wherein the metering rolls include projections, the projections on adjacent rolls pulling the cotton through the discharge end.

16. The accumulator structure set forth in claim 11 wherein the processor comprises a module builder including a conveyor located below the metering floor, the conveyor defining at least one compressing surface for compressing the cotton moved from the discharge end of the storage area.

17. The accumulator structure set forth in claim 11 further including an upper inlet structure movably supported above the storage area, the upper inlet structure having a raised field working position and a lowered transport position.

18. In a cotton harvester having harvesting structure for removing cotton from cotton plants, conveying structure for moving the cotton away from the harvesting structure, and selectively operable processing structure for compacting the removed cotton, the processing structure including an input area, accumulation structure comprising:

means for selectively providing a generally continuous and uniform supply of cotton to the input area of the processing structure when the processing structure is operating independently of variations in the amount of cotton removed by the harvesting structure, including an upright storage area having upper and lower ends and receiving cotton from the conveying structure, and selectively driveable metering structure supported adjacent the lower end defining a lowermost boundary of the upright storage area when not driven, and including means for driving the metering structure to move the cotton from the lower end of the storage area for delivery to the processing structure, wherein the metering structure, when not driven, prevents cotton from moving to the input area of the processing structure .

19. The accumulation structure set forth in claim 18 wherein the metering structure includes counter-rotating metering rolls.

20. The accumulation structure set forth in claim 18 wherein the metering structure comprises a plurality of metering rolls having axes lying generally in a plane having a substantial horizontal component and located above the input area.

21. The accumulation structure set forth in claim 18 wherein the input area of the processing structure includes a conveyor extending below the lower end of the storage area, and wherein the metering structure comprises a metering floor located in the lower end and depositing cotton on the conveyor when the metering structure is driven.

22. The accumulation system set forth in claim 19 wherein the counter-rotating rolls include projections, the rolls being timed so that the projections on one of the rolls are about 90 degrees out of phase with the projections on an adjacent roll to reduce clumping, wherein the projections facilitate blocking of the cotton when the metering structure is not driven.

23. In a cotton harvester having harvesting structure for removing cotton from cotton plants, conveying structure for moving the cotton away from the harvesting structure, and selectively operable processing structure for compacting the removed cotton, accumulation structure comprising:

an upright storage area having an upper end and a downwardly opening lower end and receiving cotton from the conveying structure, selectively driveable metering structure supported adjacent the lower end closing the storage area to egress of the cotton when not driven and metering the cotton from the storage area to the processing structure when driven; and inlet structure located at the upper end of the storage area and opening into the storage area and conveying structure, the inlet structure movable relative to the upper end of the storage area, and hydraulic cylinder structure connected to the inlet structure for moving the inlet structure between a raised operating position and a lowered transport position.

\* \* \* \* \*